United States Patent Office 3,139,263
Patented June 30, 1964

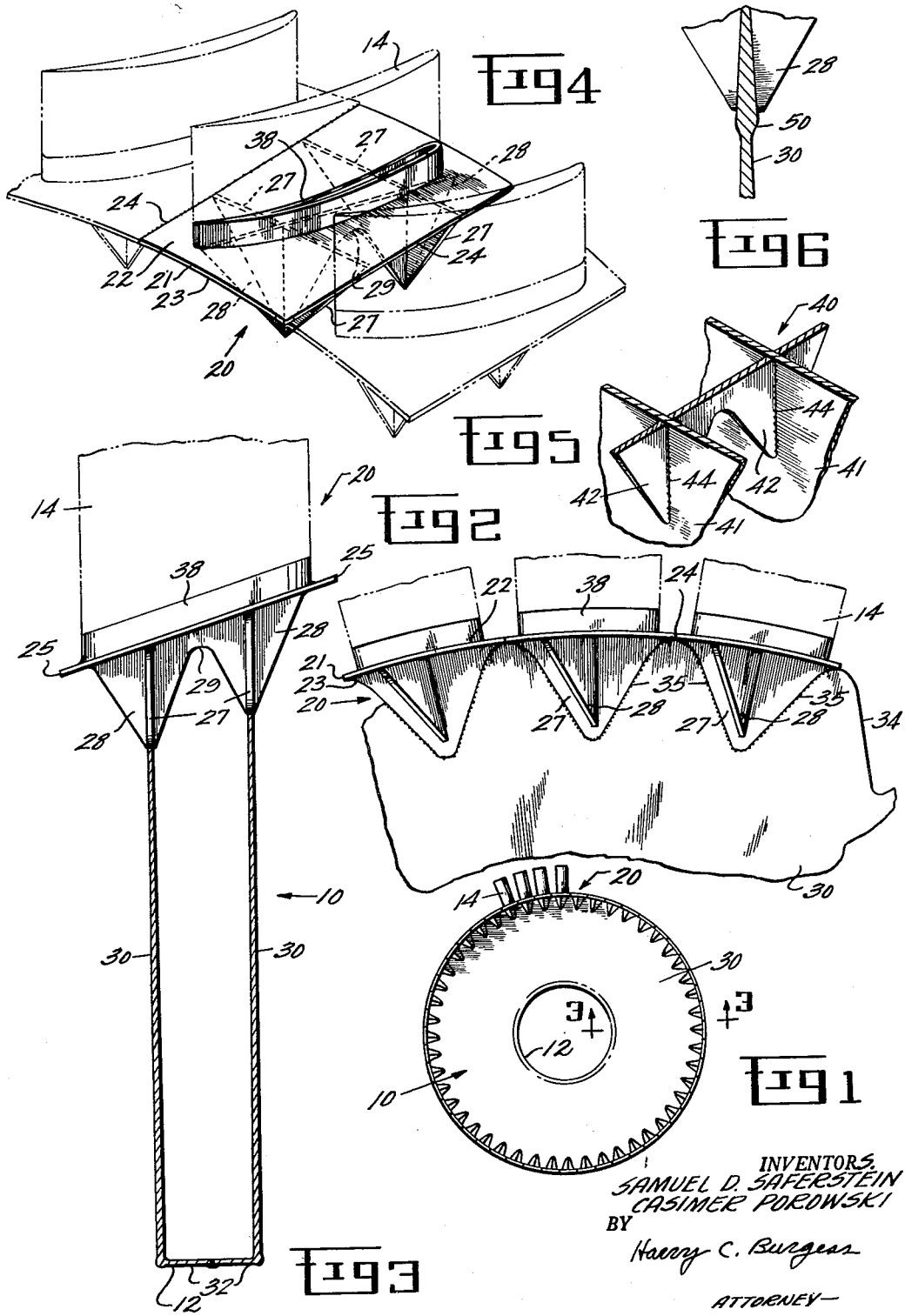

3,139,263
MEANS FOR BLADE FASTENING IN A LIGHT-
WEIGHT TURBOMACHINE ROTOR
Samuel David Saferstein and Casimer Peter Porowski, Cincinnati, Ohio, assignors to General Electric Company, a corporation of New York
Filed Dec. 26, 1961, Ser. No. 161,993
3 Claims. (Cl. 253—39)

This invention relates to means for fastening blades in a lightweight turbomachine rotor, and, more particularly, to means for constructing a turbomachine rotor having lightweight wheel disk and blade airfoil support means, the support means providing more efficient transformation of the loads imposed on the airfoil to the disk.

It has become increasingly necessary in the design of turbomachines for use in aircraft, in particular, turbojet engines for aircraft adapted to fly at high altitudes and at supersonic speeds, to make use of lightweight engine components. In the past, the typical axial-flow, turbomachine rotor assembly has consisted of a number of relatively thick, heavy, cast or forged wheel disks, arranged on a shaft or fastened at their peripheries to form a drum-type structure. Use of heavy disks has been adopted to compensate for the stresses induced in the area of the disk periphery, or rim, which supports the airfoils, or rotor blades, the blades sometimes being integral with the disk. These stresses are caused primarily by the impingement of high velocity gases on the blades, and also by reason of the centrifugal forces in the rotor. Particularly are the stresses severe in advanced turbojet aircraft due to the increased ram effect of the air rushing into the front of the engine at supersonic flight speeds.

Thus, it would be desirable to provide a rotor assembly for use in a turbomachine which, while having means to reduce the stresses associated with the transfer of the loads imposed on the blade airfoils—by the fluid flowing past the blades—to the rotor wheel disks, would, at the same time, have minimum weight. It would seem apparent that one way to attempt to do this would be to make the blade wheel disks of thin-walled, sheet-metal type material. However, this introduces additional problems related to stresses and reliability of the disk-to-blade attachment caused by the high blade loadings and the fact that sheet-metal type structures are prone to vibratory loads. On the other hand, if a lightweight turbomachine rotor construction of this general type could be made less prone to the effects of the centrifugal, gyroscopic, vibrational and torsional loads common to sheet-metal type fluid-flow machinery, so that such machinery could be utilized in supersonic turbojet aircraft applications, the great advantages attendant use of lightweight machinery would be more fully realized.

Accordingly, an object of the present invention is to provide an improved lightweight rotor construction for use in an axial-flow turbomachine.

Another object of the present invention is to provide an improved lightweight turbomachine rotor construction having an improved rotor wheel disk-to-blade airfoil connection with a consequent high rotor wheel disk efficiency.

Briefly, an embodiment of the invention comprises a highly efficient blade fastening member for use in a turbomachine rotor having lightweight, sheet-metal type wheel disks and blade airfoil construction, the member having means whereby the usually high bending stresses associated with such construction are avoided by shearing the load from the blade airfoils to the disk rim area in increments so as to minimize the possibility of local stress concentration in the disk.

The features of the invention which we believe to be novel are set forth with particularity in the appended claims. However, the invention both as to organization and method of construction, together with further objects and advantages thereof, may be better understood by reference to the following detailed description when taken in conjunction with the accompanying drawings in which:

FIGURE 1 is an end view of an axial-flow turbomachine rotor utilizing the present invention;

FIGURE 2 is an enlarged fragmentary end view of a section of the rim area of the turbomachine rotor disk shown in FIGURE 1;

FIGURE 3 is an enlarged, cross-sectional view of the rotor taken along line 3—3 of FIGURE 1;

FIGURE 4 is a pictorial view, partially in phantom, illustrating a preferred method of constructing a lightweight turbomachine rotor utilizing the present invention;

FIGURE 5 is a pictorial view, partially in cross section, illustrating an alternate embodiment of the blade attaching member of the subject invention; and FIGURE 6 is a cross sectional view of the rotor disk rim area.

As previously stated, it is highly desirable that engine weight be kept to a minimum for supersonic turbojet engine applications. A corollary to lightweight rotor construction is rotor wheel disk "efficiency." Wheel disk "efficiency" may be stated in terms of the ratio of the ideal disk weight to the actual disk weight, where disk weight is defined as the weight of the disk below the airfoil section. Thus, this latter weight includes the rim area of the rotor disk and the means for attaching the blades thereto. In other words, with a given load in a blade airfoil operating under conditions of centrifugal, torsional, and gyroscopic loads, in addition to the loads imposed by impingement of the fluid on the blade airfoil as it flows through the machine, a highly efficient rotor disk construction is one which allows a given total blade loading to be supported by a rotor wheel disk of minimum weight. Obviously, as applied to an axial-flow compressor where a plurality of stages in series are utilized, the higher efficiency of each wheel disk will be expressed in a corresponding total weight reduction of the turbomachine. In comparison with known turbomachine rotor constructions utilizing the typical cast or forged wheel disks, with or without integrally formed blades, either carried on a shaft or supported by connecting means adjacent the rims thereof, means of constructing a lightweight turbomachine rotor of the present invention has proved to be at least 100% more efficient than the most efficient prior known design.

Referring now more particularly to FIGURE 1 of the drawings, indicated therein a rotor wheel disk for use in a turbomachine compressor. While a compressor has been used for purposes of illustration it will be obvious from the description that the invention may be equally applied to a fan rotor construction, for example. In FIGURE 1, the rotor wheel disk will be seen to include a radially-extending web portion, indicated generally at 10, having a central aperture 12. Mounted on the rim are a plurality of rotor blades, or airfoils 14. Indicated generally at 20, in FIGURE 1, is a rotor blade attaching member, or load transition piece, which is a primary feature of a rotor constructed in accordance with the invention.

Turning now to FIGURE 2, which is an enlarged end view of a portion of the rim area of the rotor wheel disk, each of the blade airfoil attaching members, or transition pieces 20 will be seen to include a platform portion 21 having an upper surface 22 and a lower surface 23. The edges of the platforms of adjoining transition pieces are adapted to abut at 24 to form a portion of the continuous flow-path in the turbomachine. It will be understood that the space upstream and downstream of the row of blades, i.e., opposite edges 25—25, in FIGURE 3, may be filled with stator rings, or shrouds (not shown) in the well known manner of constructing multistage, axial-flow machines. As best seen in FIGURES 2 and 3, depending from the lower surface of each platform is a first pair of webs, or supporting portions 27—27. These webs are triangular in form with the base of each triangle being integral with the platform portion and the apex of the triangle extending radially inward towards the axis of the rotor. Each of the pair of triangular-shaped elements, or webs 27—27 is, in turn, bisected by one of a second pair of triangular-shaped webs, or supporting elements 28—28, which also depend from the undersurface of the platform portion, extending radially inward. This second pair of triangular-shaped webs, or elements, as shown, come together at 29 to form a single web extending in a plane at an angle to the axis of the turbomachine and to the plane of the wheel disk, i.e., substantially in line with the airfoil section.

As will best be seen in FIGURE 3, the wheel disk 10 of the present invention is preferably comprised of a pair of thin, lightweight, sheet-metal type walls 30—30. The walls are parallel to each other and are preferably joined by an axially-extending annular piece 32, which forms the aperture 12. Whereas the second pair of webs, or support elements, 28—28 extend transversely of each disk wall, it will be seen from FIGURES 2 and 3 that the triangular-shaped webs, or support elements, 27—27 are adapted to fit into cut-outs, or notches 34 in the rim of each wheel disk wall 30. The webs 27—27 are adapted to be permanently joined to the disk by brazing, welding or otherwise securely uniting the metal material along the edges 35. Thus, it will be realized that the rim area of each disk wall 30—30 is formed into an integral closed ring structure.

The preferred embodiment of the invention also comprehends that the blade-supporting members, or transition pieces 20 will comprise lightweight, integral castings, adapted to be joined together in a ring, as perhaps best seen in FIGURE 4, in a manner, now to be described, of constructing the turbomachine rotor according to the present invention. To construct the lightweight turbomachine rotor, we first provide a thin-walled, lightweight, sheet-metal rotor disk which includes a pair of radially-extending wall portions, such as shown in the drawings. The disk is placed on a rotatable fixture and a triangular notch of predetermined depth and angle is cut in the rim area of each wall, the notches of each wall being axially aligned. The wheel disk is then repeatedly indexed while similar notches are cut at spaced circumferential locations throughout the rim area. Next, we construct an integral ring structure by casting, forging, or fabricating a suitable number of lightweight, blade-supporting members, or transition pieces 20. The pieces are then placed in a jig and joined at 24 along the axially-extending edges of the platforms thereof. Blade airfoils 14 are then permanently joined to the blade stalk or stub portions 38 projecting from the upper surface of the transition piece platform portion. The stub and airfoils may be joined butt-to-butt, as shown, or the airfoil may be slipped over the stub and brazed thereto. The resulting integral ring structure is then removed from the jig and axially aligned with the disk webs. The ring structure is then indexed to a position wherein the triangular-shaped web portions of the castings 27—27 are aligned axially with the notches 34 in the disk wall rims. With the web portions aligned with the notches in the wheel disk wall rims, the integral ring structure is moved over the wheel disk 10 and into position wherein the webs 27—27 are in the notches 34. Finally, the integral ring structure is permanently welded or brazed to the rotor wheel disk along the joints 35 by applying weld or braze material to the abuting web portions 27—27 and wheel disk notches 34 in each area, the entire assembly being indexed until all of the transition pieces, or supporting members 20, of the ring are permanently jointed to the wheel disks.

FIGURE 5 illustrates an alternate construction wherein a split web, or support portion, is utilized in a load transmitting member 40. In the drawing, which is partially cut-away to better illustrate the manner of connection with a pair of the wheel disk walls 41—41, there is shown a pair of triangular-shaped support elements, or webs, 42—42. The support elements, or webs, 42—42 are slotted at 44 to enable them to be slipped over the outer rim portions of the wheel disk walls 41—41. The triangular support elements are then permanently affixed by welding or brazing to the wheel disk walls along the slot-to-disk joints, which bisect the support portions to form the integral structure. Again, the initial step in a manner of constructing a lightweight rotor according to the invention consists of forming a plurality of the airfoil carrying blade transition pieces 40 into an integral ring structure which may then be split into two 180° sections for joining with the wheel disks which slip into the slots 44—44 preparatory to welding the entire structure into a lightweight turbomachine rotor.

With use of the described joining members, or transition pieces having triangular-shaped blade-supporting webs, loads which are imposed upon the blade airfoils by the fluid acting thereon are transmitted by a change of direction from the blades to the wheel disk walls. That is to say, the loads are transformed gradually to the disk walls through the fibers of the material from which the triangular portions are constructed. In addition, as will be seen from FIGURE 6, the thin-walled blade disk walls 30—30 are slightly enlarged at 50, adjacent the apices of the triangular shaped pair of webs 28—28, the disks tapering gradually outwardly to the rim edge beneath the undersurface of the blade platforms to a thickness approximately equal to the average thickness of the disk web from the center, or hub portion to the rim portion. This insures that the blade loads will be transformed into the disk in shear, rather than in bending, and in decreasing incremental amounts along the length of wedge shaped portions 50 of the disk rim through the integrated structure of the transition piece 20 and through the joint at 35. Thus, local stress concentrations in the rim areas of the disk walls are minimized. In addition, by joining the discrete, load supporting transmission pieces 20 into a single integral ring structure prior to assembly with the lightweight wheel disk 10 it enables the blade platforms not only to be self-supporting, but also to support part of the blade load. This aids the rotor disk assembly in handling the blade loads since the "ring" will tend to resist torsional loads imposed upon the blades by reaction of the fluid on the airfoils.

Although the transition pieces 20, or 40, of the present invention have been described as comprising individual, lightweight castings, they could equally be constructed of sheet-metal fabrication. Use of a lightweight precision casting, however, facilities further the use of hollow fabricated blades since the blade airfoils may then be welded end-to-end to the stub portions 38 provided on the castings. In this manner each airfoil and transition piece assembly can be fixtured and joined in a continuous, self-supporting ring structure prior to assembling the entire rotor 10. In other words, the wheel disks can be separately constructed of lightweight, sheet-metal type material and mechanically, or chemically, machined to the exact profile contour. Assembly of the airfoil and support member ring with the disk is thus facilitated since the two parts may then be precisely fixtured and aligned before the triangular-shaped support webs are welded into place in the disk wall cut-outs. Improved welding techniques have made this assembly method even more advantageous due to the increasingly high strength levels of improved, more reliable, bonding materials. Use of these improved welding methods and bonding materials, which results in minimum distortion in lightweight, sheet-metal parts, has therefore further enabled the benefits of the invention to be realized.

Obviously, other modifications and variations of the improved lightweight, sheet-metal type rotor construction having high efficiency disk and improved load transition characteristics, as disclosed herein, that are within the scope of the invention, will occur of those skilled in the art. However, it is intended that the appended claims will cover all such modifications and variations.

Accordingly, what is claimed is:

1. A lightweight turbomachine rotor including:
   a rotor disk comprising axially-spaced, thin, sheet-metal wall portions;
   a plurality of airfoil members adapted to be supported on the peripheries of said disk wall portions;
   and a plurality of discrete support pieces of said airfoil members, each of said support pieces including,
   (a) a platform portion,
   (b) a first pair of triangular-shaped web portions integral with said platform portion, the apices of said web portions being directed towards the rotor axis, said first pair of web portions being secured to said peripheries, and
   (c) a second pair of triangular-shaped web portions integral with said platform portion, each of the web portions of said second pair bisecting a web portion of said first pair,
   said first and second pairs of web portions transmitting the airfoil loads to said rotor disk in shear increments so as to minimize stress concentration in the peripheral areas thereof.

2. A lightweight turbomachine rotor including:
   a rotor disk comprising axially-spaced, thin, sheet-metal wall portions;
   a plurality of airfoil members adapted to be supported on the peripheries of said disk wall portions;
   and a plurality of discrete support pieces for said airfoil members, each of said support pieces including,
   (a) a platform portion having an upper surface forming a part of the flow path in the turbomachine rotor and a lower surface,
   (b) a first pair of triangular-shaped web portions on said lower surface extending inwardly of the rotor and being secured along the edges thereof in cut-outs in the disk peripheries, and
   (c) a second pair of triangular-shaped web portions on said lower surface, said first and second pairs being at angles to each other and in a bisecting relationship,
   said first and second web portions transmitting the airfoil loads to said rotor disk in shear increments so as to minimize stress concentration in the peripheral areas thereof.

3. A lightweight turbomachine rotor construction comprising:
   a rotor disk, said disk including a pair of axially-spaced, radially-extending wall portions, each wall portion having a tapered peripheral area, said wall portions being joined adjacent a central aperture therein;
   a plurality of lightweight airfoil members adapted to be supported on the peripheries of said rotor disk wall portions;
   and a plurality of discrete support pieces for said airfoil members, each of said discrete support pieces including,
   (a) a platform portion having an upper surface and a lower surface,
   (b) an airfoil stub portion on the upper surface adapted to be securely attached to one of said airfoil members,
   (c) a first pair of triangular-shaped transition webs depending from said lower surface, said first pair of webs being arranged with the apices of the triangle directed toward the rotor axis, said webs extending in the planes of the wheel disk wall portions and being secured in triangular-shaped cut-outs in the peripheral areas thereof, and
   (d) a second pair of triangular-shaped webs depending from said lower surface at an angle to said first pair, said second pair being coextensive with the first pair of webs,
   said first and second pairs of webs transmitting the loads in said airfoil members in sheared increments to the tapered peripheral areas of the rotor disk wall portions in a manner such as to minimize stress concentrations in said areas.

References Cited in the file of this patent

UNITED STATES PATENTS

| | | |
|---|---|---|
| 2,819,870 | Wayne | Jan. 14, 1958 |
| 2,865,598 | Moseson | Dec. 23, 1958 |
| 2,888,239 | Slemmons | May 26, 1959 |
| 2,925,248 | Stalker | Feb. 16, 1960 |